Figure 1:
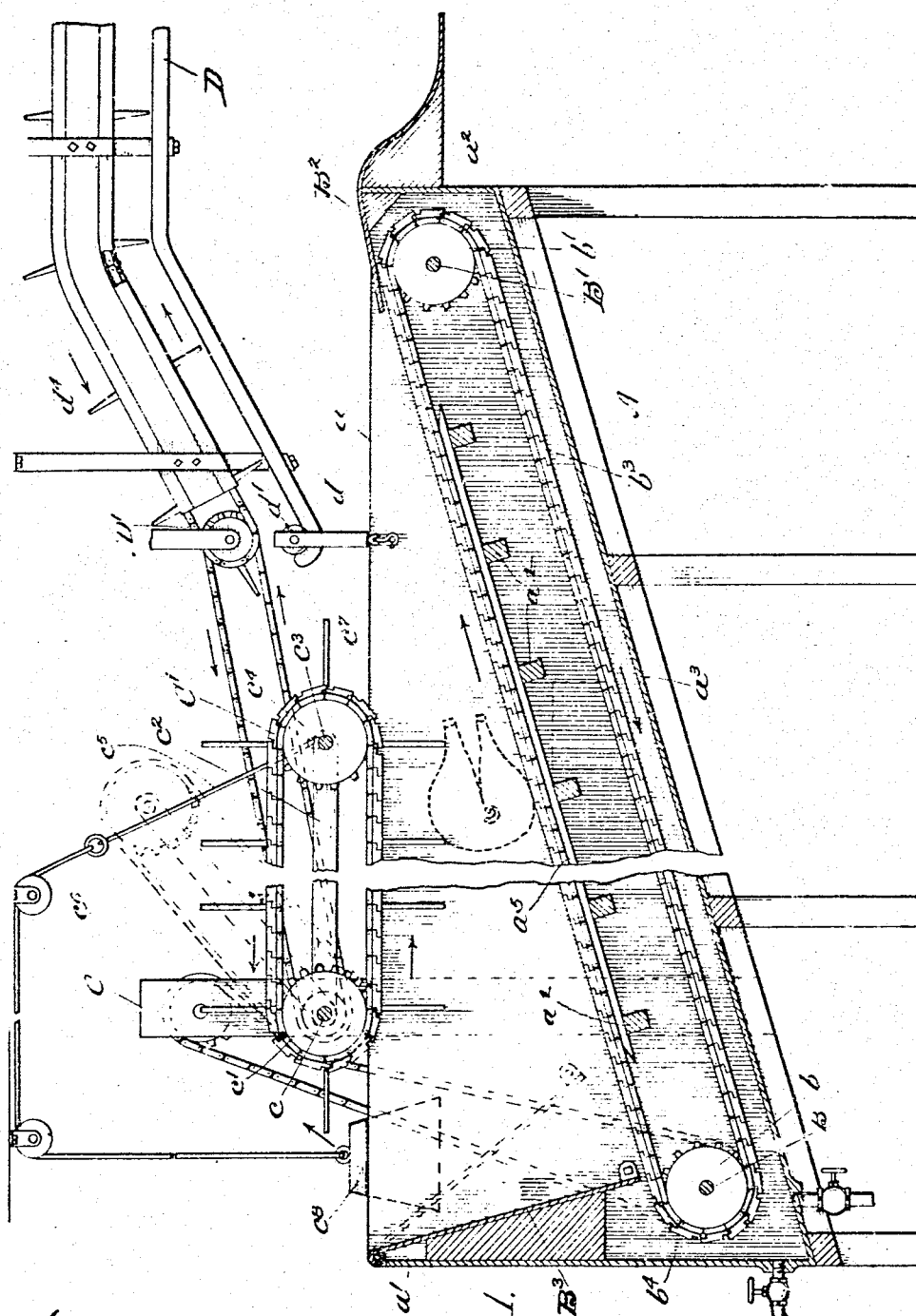

J. W. KOHLHEPP.
HOG SCRAPER.
APPLICATION FILED MAY 18, 1906.

994,523.

Patented June 6, 1911.
7 SHEETS—SHEET 1.

Witnesses:
Ray White.
Harry R. White.

Inventor
John W. Kohlhepp
By Charles W. ___, Atty.

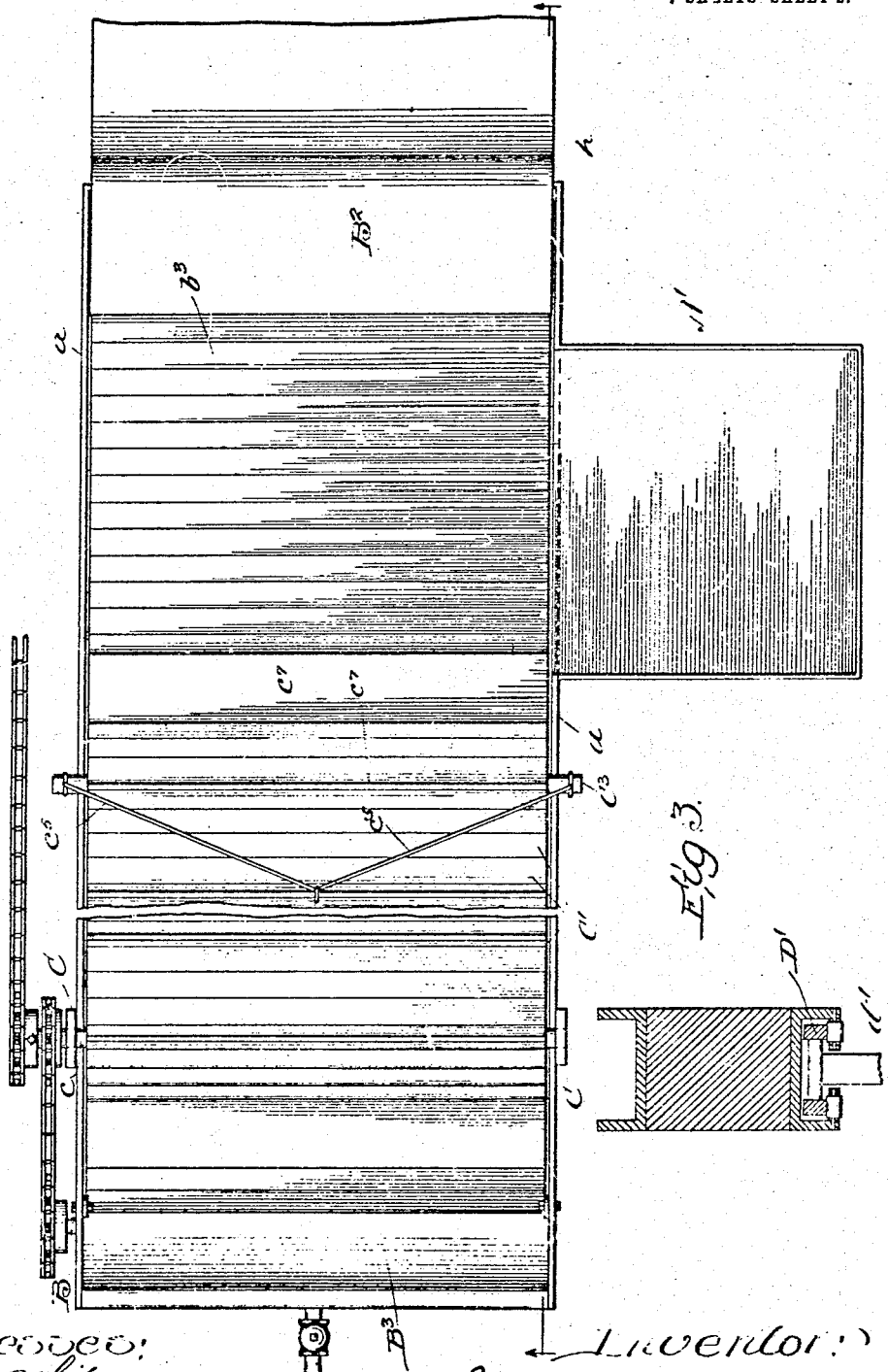

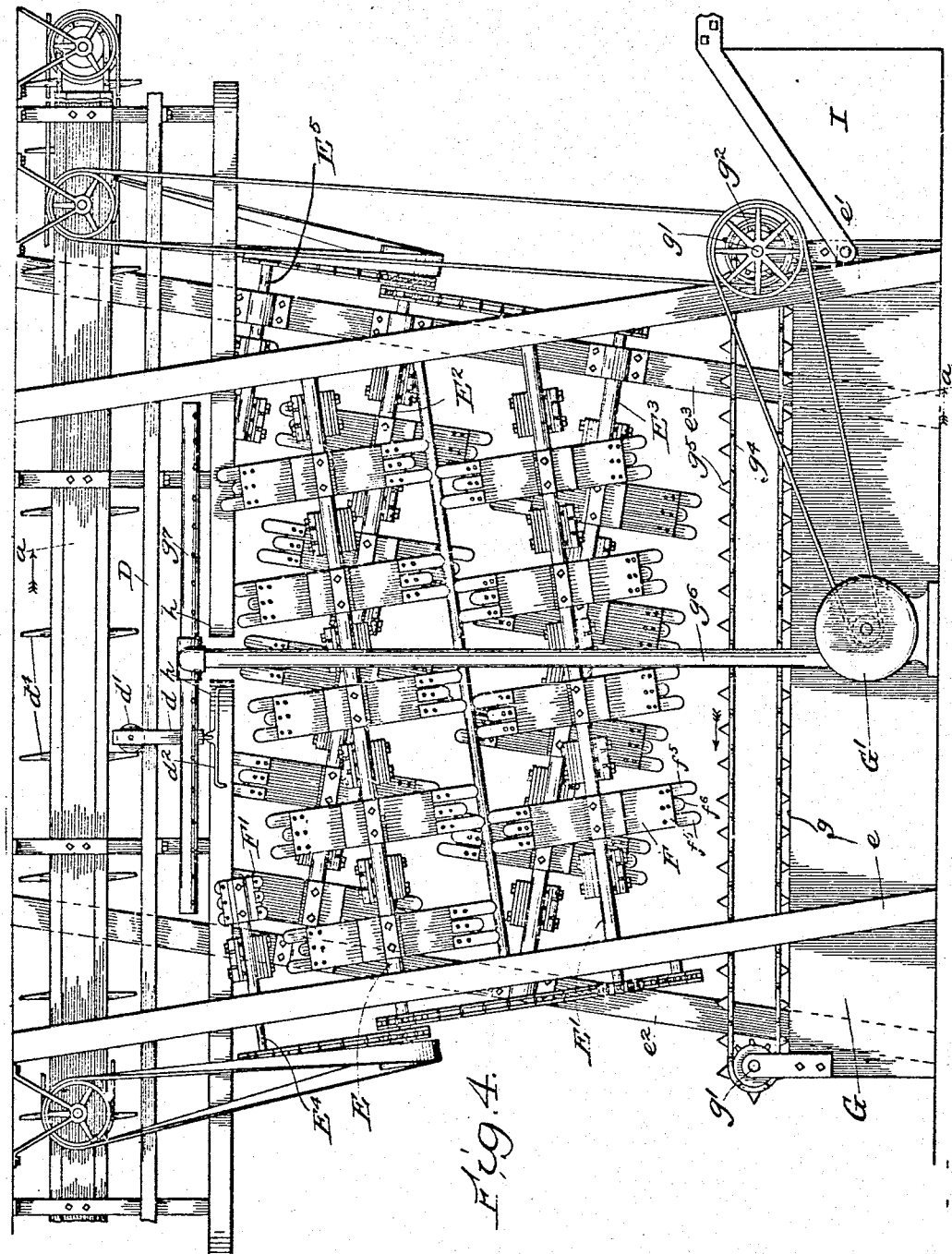

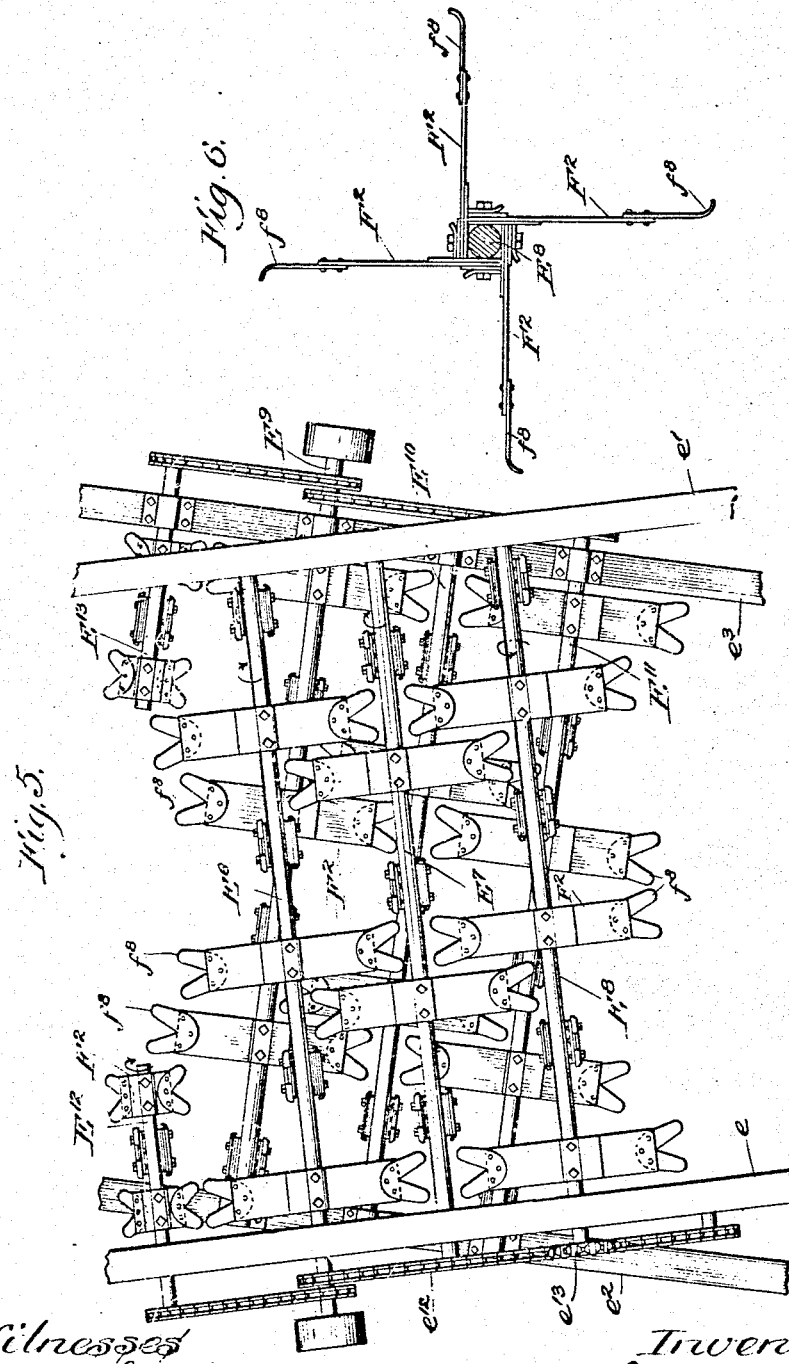

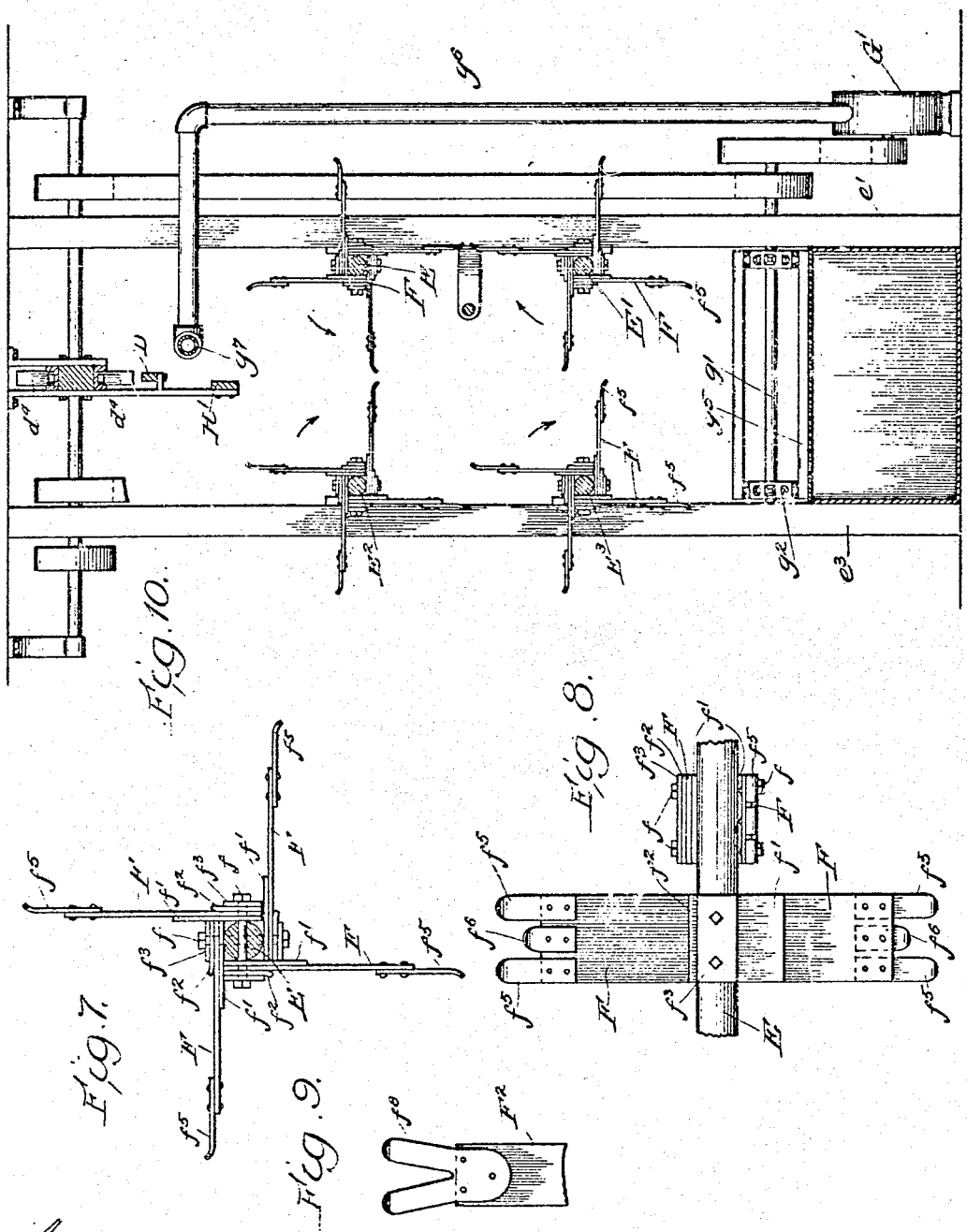

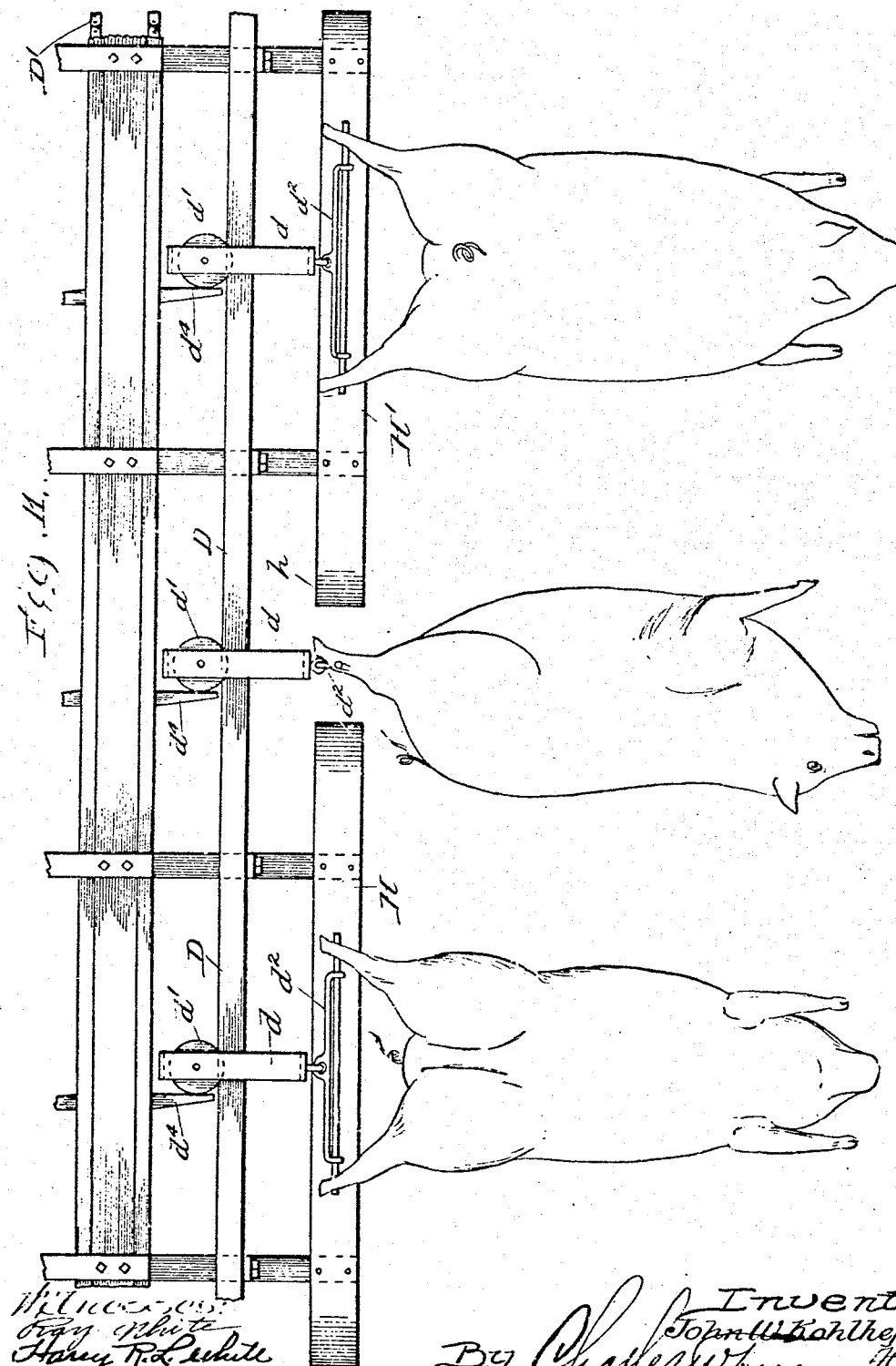

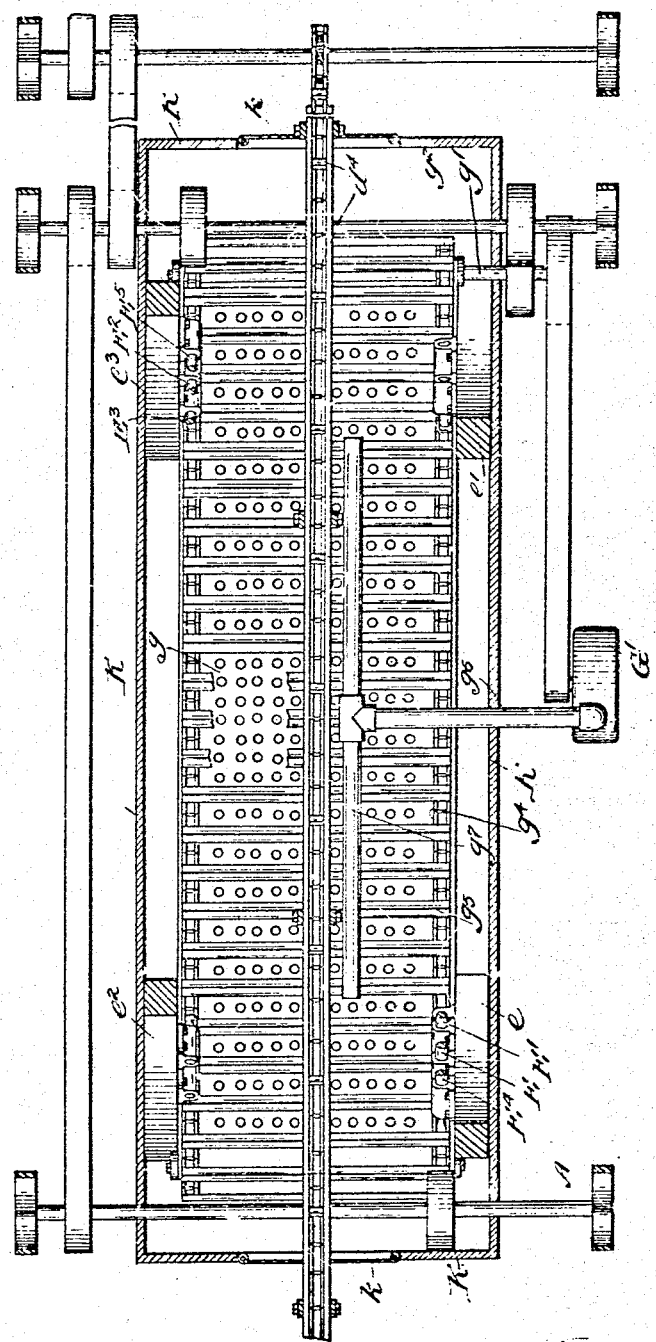

UNITED STATES PATENT OFFICE.

JOHN W. KOHLHEPP, OF CHICAGO, ILLINOIS, ASSIGNOR TO THE ALLBRIGHT-NELL COMPANY, A CORPORATION OF ILLINOIS.

HOG-SCRAPER.

994,523.   Specification of Letters Patent.   Patented June 6, 1911.

Application filed May 18, 1906. Serial No. 317,451.

*To all whom it may concern:*

Be it known that I, JOHN W. KOHLHEPP, a citizen of the United States, and a resident of the city of Chicago, in the county of Cook and State of Illinois, have invented certain new and useful Improvements in Hog-Scrapers; and I do hereby declare that the following is a full, clear, and exact description of the same, reference being had to the accompanying drawings, and to the letters of reference marked thereon, which form a part of this specification.

This invention relates to improvements in mechanical hog scrapers, adapted to operate upon the carcass while the same is traveling from the scalding tank to the cutters.

In the various devices heretofore constructed for scraping hogs mechanically there have always been portions of the carcass that were not reached by the scraper and this necessitated the employment of a large number of men arranged along the runway or track on which the carcass is carried and who completed the scraping manually. Most mechanical scrapers require a large amount of space for the installation of the machines and owing to this they are exceedingly expensive to install.

The object of this invention is to provide first a scalding tank wherein the scalding of the carcass can be regulated for a longer or shorter period as desired, and wherein mechanical carriers deliver the carcass therefrom to the track on which the carcass is carried through the scraper and to the cutters.

It is a further object to provide beneath and on each side of said track mechanical devices whereby all the hair and bristles are removed from the carcass and the carcass is thoroughly washed and cleansed.

It is a further object of the invention to afford a construction wherein a continuous spray of hot water of the desired temperature is delivered upon the carcass during the scraping operation.

It is also an object of the invention to provide mechanism for rotating or partly rotating the carcass as it is carried through the scraping machine.

The invention consists in the matters hereinafter described and more fully pointed out and defined in the appended claims.

In the drawings: Figure 1 is a central vertical section of the scalding tank and the receiving end of the track or runway whereon the carcasses are delivered to the scraper. Fig. 2 is a top plan view of the same. Fig. 3 is an enlarged transverse section of one of the conveyers. Fig. 4 is a side elevation of one form of scraping machine. Fig. 5 is a similar view showing however three shafts on a side and with the tank beneath the scraper and the return conveyer removed. Fig. 6 is an enlarged transverse section of one of the scraper shafts shown in Fig. 5. Fig. 7 is a similar section but taken at the bolt. Fig. 8 is a fragmentary side elevation of one of the scraper shafts and the flexible arms thereon. Fig. 9 is an enlarged fragmentary view of the knives shown in Fig. 5. Fig. 10 is a central vertical section at a right angle to the mechanism shown in Fig. 4. Fig. 11 is an enlarged fragmentary view of the track, runway or conveyer for the carcasses and illustrates the rotating of the carcass during the scraping operation. Fig. 12 is a fragmentary horizontal section taken below the scrapers and above the lower conveyer.

As shown in said drawings: the invention embraces a scalding tank provided with conveyers, a runway or track to which the carcasses are delivered from the scalding tank by the conveyers; the scraping mechanism; and the return conveyer beneath the scrapers, all of which are so assembled and connected as to coöperate continuously in thoroughly scalding, scraping and washing the carcass, and in carrying the carcass during the scraping to present all surfaces thereof to the action of the mechanism. Said scalding tank A embraces side walls *a* and end walls *a'* and *a²* and an inclined bottom *a³* and is deepest at its front or receiving end at the wall *a'*, and is relatively shallow at its rear end. Said tank is of a width to enable a number of carcasses to be received therein at the same time and is provided as shown at one side of the same with a lateral receiving tank A' see Fig. 2, of considerable depth and width and opening thereinto and in which the rough carcasses or those having very heavy bristles may be retained for a time sufficient to complete the scalding. Extending longitudinally along the bottom of said scalding tank is a chain belt conveyer *b³* driven from shafts B and B' and comprising as shown in Figs. 1 and 2 suitable link chains connected by transverse lags indicated by $b^4$ and which are driven from sprocket wheels $b$—$b'$ on said shafts. Said conveyer at its rear or delivering end extends approximately level with the top of the tank and overlapping the same as shown, is a metallic plate $B^2$ which fits relatively close to said conveyer and upon which the carcasses are drawn in delivering the same from the tank. Rigidly engaged transversely in said tank to said side walls $a$ are the bars or supports $a^4$, upon which is firmly secured the platform $a^5$ which form a rigid support for the upper run of the chain belt conveyer $b^3$.

At the front end of the tank as shown is a depending metallic plate $B^3$ which is hinged at the upper edge of the end wall $a'$ of the tank and is adapted to be swung inwardly as shown in dotted lines in Fig. 1 and directs the carcasses delivered into the receiving end of the tank inwardly upon the conveyer.

Positioned above the tank and journaled transversely upon suitable supports or standards C is a shaft $c$ provided with sprocket wheels $c'$ and about which is trained a conveyer belt C′ which pushes the carcasses upwardly upon the conveyer $b^3$. Extending from the shaft $c$ are struts or spacing bars $c^2$ the inner ends of which are journaled on the shaft $c$ and at the outer end of which is journaled a shaft $c^3$ provided with sprocket wheels $c^4$. Engaged at the ends of the shaft $c^3$ is a stirrup $c^5$, at the middle of which is engaged a line $c^6$ trained over suitable pulleys and from which depends a counterweight $c^8$ whereby the rear end of said conveyer can be supported at any adjusted height. Blades or lags $c^7$ are provided on said conveyer which on the lower lap thereof project into the tank and travel toward the rear and push the carcasses upwardly upon the conveyer $b^3$.

Positioned centrally above the rear end of the tank and extending rearwardly therefrom is a runway or track D, upon which travel the gambrel carriages, which carry the carcasses. Each carriage comprises a metallic strip $d$ having a downwardly facing sheave or roller $d'$ on the upper end thereof adapted to run on said track. Pivoted to rotate on the lower end of said strap $d$ is the gambrel stick or bar $d^2$. Above said track D is a chain conveyer D′ the chain of which is provided with outwardly projecting arms $d^4$, which engage behind the gambrel carriages and push them along the track and through said scraping mechanism, shown in Figs. 4 and 11. Said scraping mechanism embraces oppositely inclined sets of parallel shafts E—E′ and $E^2$—$E^3$ on opposite sides of the track D and of which the shafts E and E′ are journaled at their ends on uprights $e$—$e'$ which as shown though not necessarily are inclined and the shafts $E^2$ and $E^3$ are journaled at their ends on the oppositely inclined uprights $e^2$ and $e^3$. Said shafts on the same side of the track are arranged one above the other and the shafts E, $E^2$ and $E^3$ rotate from the top inwardly and downwardly and the shaft E′ rotates from the bottom inwardly and upwardly as shown in Fig. 10. Secured on each of said shafts are flexible beaters or arms F each consisting of a strip of rubber belting, canvas, or other suitable material. These are secured on said shafts in oppositely directed pairs on opposite sides of the shaft by means of bolts $f$ extending therethrough and through the shaft and extending also through plates $f'$ engaged beneath each of said belts or beaters and projecting outwardly along the inner side of the same and plates $f^2$ and $f^3$ secured on the outer side of the beaters. Corresponding beaters are arranged closely adjacent said beaters and at right angles therewith and are staggered or alternately arranged with those of adjacent shafts either on the opposite side of the scraper or below the same to avoid contact of those on the one shaft with those on the other. On the outer end of each of said beaters or belts are the scraper knives comprising slightly curved metallic plates $f^5$—$f^6$ of which the laterally disposed scrapers $f^5$ are of equal length and the intermediate scraper $f^6$ is considerably shorter. Said shafts may obviously be of any desired length and arranged at any preferred angle and any desired number of said beaters and scrapers may be secured thereon dependent upon the rate at which the carcasses are to be delivered therebetween. Above the lower end of the upper shafts E and $F^2$ are journaled shafts $E^4$—$E^5$ respectively upon which are secured belts or arms $F^7$ of less length than those heretofore described.

Positioned beneath the scraping machine is the scraper tank G for the bristles. This may be of any desired size and provided with a perforated top or cover $g$, as shown in Fig. 12. Journaled upon suitable standards above each end of said tank are shafts $g'$ and $g'$ on which are suitable sprocket wheels $g^2$ which drive conveyer chains $g^4$ trained around the same and which as shown are connected by transverse lags $g^5$ which on the upper run of the conveyer travel rearwardly or toward the scalding tank so that should a carcass fall from the gambrel rod or stick during the scraping operation it is carried outwardly and to the rear end of the scraper and may be again carried through the machine or otherwise treated as preferred. The lower run of said conveyer moves along the top of the scraper tank and the lags serve to dump the bristles into the tank through said perforations or may scrape them into a suitable apron I at the front end of the tank. Driven from the same shaft that drives said bottom conveyer is a pump G' with which is connected suitable piping $q^6$ the upper end of which $q^7$ is perforated and extends longitudinally and centrally above the scrapers and constantly delivers hot water upon the carcasses being treated.

If preferred four beater shafts may be provided on each side of the track. Such a construction is shown in Fig. 5, in which the shafts $E^5$ to $E^{11}$, inclusive are arranged, three inclined in one direction and three inclined in the opposite direction so that said shafts are arranged obliquely in oppositely disposed sets with those on the same side of the track or runway arranged one above the other. The beaters $F^2$ are such as before described with the exception that as shown the scraper knives on each comprise a plate of metal cut to afford a V shaped notch at the middle and laterally directed arms $f^8$, which are curved as shown in Fig. 6. Above the shaft $E^6$, as shown is also provided the relatively short shaft $E^{12}$ and above the shaft $E^9$ as shown is provided a short beater shaft $E^{13}$. All of said shafts rotate inwardly and downwardly with the exception of the shaft $E^8$ which as shown is driven from the sprocket chain $e^{12}$ and the sprocket wheel $e^{13}$ therefore engages on the outer side thereof, thereby rotating the shaft in a direction opposite from the shafts above the same.

The scraping mechanism is inclosed laterally within suitable walls K shown in Fig. 12 to prevent the water and the bristles and material removed from the carcass being thrown laterally from the machine and if desired may be provided with self closing doors both at the entrance thereto and exit therefrom so that the carcass swinging against the doors force the same open to permit the entrance of the carcass and in the same manner the rear doors are swung open to permit the exit of the carcass.

The operation is as follows: The carcass is delivered into the scalding tank in any preferred manner and an average carcass is retained for but a short period therein and then is engaged by the upper feed or tank conveyer and pushed onto the conveyer $b^3$ in the bottom of the tank. It is by this carried upwardly into position for an operator to engage the carcass on the gambrel stick as shown in Fig. 11. Should the carcass however be that of an old hog or as it is termed of a rough carcass having stiff and heavy bristles thereon it may sometimes be desirable to retain it for a longer period in the scalding tank. The carcass is therefore pushed off into the lateral extension A' of the scalding tank and is permitted to remain there as long as necessary after which it is pushed upon the conveyer and delivered to the track D as before described. Having engaged the carcass upon the gambrel stick and placed the pulley thereof upon the track D, the conveyer D' above the same engages the carriage and pushes it along the track with the carcass depending therefrom and carries the carcass into the scraping mechanism. As the carcass passes inwardly the rapid rotation of the shafts brings the scrapers on the beaters F'—F$^2$ and F$^3$ thereof in more or less violent contact with the skin of the animal beating the hair and bristles cleanly therefrom and also removing the epidermis. The operation is facilitated by the constant spray of hot water from above, which serves not only to aid in loosening the hair and bristles and the epidermis but as well thorougly washes the carcass during the operation.

As the carcass passes inwardly it is desirable to partly rotate it to bring all parts into contact with the scrapers and for this purpose as shown in Fig. 11 guides H—H' are provided against which the gambrel stick for the carcass slides. These guides extend inwardly from each end to near the middle of the scraper and are so positioned that the carcass supported on the gambrel stick is thereby held slightly out of alinement with the point of support. The adjacent ends turn outwardly, so that sliding along the guide H and reaching the end thereof the forward end of the gambrel stick swings outwardly in part by gravity thereby partly rotating the carcass, as shown in Fig. 4, so that the inclined end $h$ of the adjacent guide sections H' may when engaged still further rotate the carcass which for the remainder of the distance through said scraping mechanism is carried with the opposite side of the gambrel against the guide the carcass having rotated 180°. Owing to the construction of the scrapers and the arrangement thereof it is obvious that all parts of the carcass are reached thereby and inasmuch as one of said shafts rotates from the bottom upwardly and inwardly the scrapers are thrown upwardly against the lower portion of the carcass or parts that could not be so readily reached by the downwardly operating scrapers.

Of course the capacity of the machine is determined by the rate at which the carcasses can be delivered therethrough. Should it be desired to increase the capacity of said mechanism additional shafts may be used increasing the travel through the machine and moving the carcasses at a much higher rate of speed.

Of course the mechanism described may be operated by any suitable arrangements of belts and pulleys and I do not purpose limiting this application for patent otherwise than necessitated by the prior art as many details of construction and arrangement may be varied without departing from the principles of my invention.

I claim as my invention:

1. In a device of the class described a conveyer, rotatable flexible beating mechanisms inclined longitudinally in the direction of travel of the carcass and acting on opposite sides of the carcass drawn therebetween, said beating mechanisms arranged staggering, means for rotating the scraping mechanisms and means for removing the bristles and scurf as scraped from the carcasses.

2. In a device of the class described the combination with a suitable conveying mechanism, rotatable flexible beating mechanism oppositely inclined longitudinally in the derection of travel of the carcass and operating on opposite sides thereof to beat the bristles and scurf therefrom, and means preventing short bending of the beating mechanism.

3. In a device of the class described scraping mechanisms inclined longitudinally of the machine and in the direction of travel of the carcass and acting on opposite sides of a suspended carcass drawn approximately horizontally therebetween and a track or runway to carry the carcasses.

4. In a device of the class described the combination with a track of scraping mechanisms on each side thereof and inclined oppositely longitudinally of the track adapted to act on opposite sides of a suspended carcass and means moving the suspended carcass along the track.

5. In a device of the class described, conveying mechanism, inclined scraping mechanisms acting on opposite sides of a carcass while moving therebetween and means partly rotating the carcass in its passage between the scraping mechanisms.

6. In a device of the class described conveying mechanism, oppositely inclined scraping mechanisms, means carrying suspended carcasses therebetween and means rotating the carcasses while engaged by the scrapers.

7. In a machine of the class described a runway or track, scraping mechanisms on each side of the track acting on opposite sides of a vertically suspended carcass moving between the scrapers, short shafts at each end of the machine inclined oppositely and positioned above the aforesaid scraping mechanisms, scraping means on said shafts adapted to act on the higher parts of the carcasses and means adjacent the track adapted to turn the carcasses while being operated upon by the first named scraping mechanisms and said means adapted to prevent rotation of the carcasses while being acted upon by the last named scraping means.

8. In a device of the class described a track, a scalding tank, a lateral receiving tank communicating therewith, a conveyer in the scalding tank, adjustable means above the conveyer adapted to aid the conveyer in moving the carcass from the scalding tank, a conveyer above the track, gambrel carriages movable on the track by the last named conveyer and each adapted to carry a carcass, scrapers below the track acting on both sides of a carcass, part acting upwardly and the remainder acting downwardly and means below the track adapted to partially turn the carcasses.

9. In a carcass cleaning machine the combination with conveying means, means delivering carcasses to the same, a shaft inclined in the direction of travel of the carcass, beating means on the shaft acting on the carcass as moved therepast, a fluid supply tank, means for turning the carcass and means delivering fluid upon the carcass while acted upon by the beaters.

10. In a device of the class described a track, a conveyer above the track, gambrel carriages movable on the track by the conveyer and each adapted to carry a carcass, scrapers acting at an angle from the vertical and simultaneously on both sides of the carcass, a lower rotary scraping mechanism acting oppositely from the upper scrapers, flexible arms thereon each adapted to strike the carcass during rotation and auxiliary shorter flexible arms adapted to act on the highest part of the carcass.

11. In a device of the class described, a track or runway along which the carcasses move, a plurality of shafts arranged on opposite sides of the runway and inclined longitudinally thereof, scraping mechanism on said shafts adapted to act downwardly on a suspended carcass, scraping mechanism adapted to act upwardly on the carcass and downwardly acting scraping mechanism positioned above and at each end of the aforesaid scraping mechanism.

12. In a device of the class described the combination with a track or runway of a plurality of shafts extending longitudinally of the runway, rotatable scraping mechanisms on some of said shafts adapted to act downwardly on a suspended carcass, rotatable scraping mechanisms on some of said shafts adapted to act upwardly on the carcass and means adapted to convey a fallen carcass from beneath the scraping mechanism.

13. In a device of the class described a runway or track, a conveyer adapted to move carcasses in succession along the same, scrapers inclined at an angle with the vertical acting on the moving carcasses, means turning the carcasses during its passage by the scrapers, a fluid tank below the scrapers, a receptacle at one end thereof, means for washing the bristles and scurf from the carcasses and means movable over the tank to move the bristles and scurf into said receptacle.

14. In a device of the class described the combination with a runway or track, means for moving carcasses therealong, scraping and beating mechanisms arranged to act on the carcass as it moves along the track, means below the tracks for automatically turning the carcasses, scraping mechanism at each end of the aforesaid scraping mechanisms and arranged nearer together than the same, a spraying device for washing the carcasses, a water tank adapted to supply said spraying device, a conveyer above the tank adapted to remove the bristles and other refuse as washed from the carcasses and a receptacle for receiving said bristles and refuse.

15. In a device of the class described a runway or track, scraping mechanism arranged on each side of the track, means intermediate the ends of the scraping mechanisms for partly rotating the carcasses as they pass along the track, a conveyer acting to move the carcasses through the scraping mechanism and auxiliary scrapers positioned above said scraping mechanism.

16. A mechanism for the purpose specified embracing oppositely rotatable members, beating means carried thereby beating a carcass on opposite sides as it passes therebetween, lower beating mechanism part acting upwardly and part downwardly on the carcass, rigid means above and between the beaters for turning a carcass, spraying means adjacent the turning means for washing the carcass as scraped and means for moving the hair and refuse and a fallen carcass to opposite ends of the machine.

17. A scraping mechanism embracing an upper track to support and carry the carcasses, upper downwardly acting scraping means, and lower upwardly acting scrapers acting simultaneously on the carcass and means automatically turning the carcasses after being acted upon by part of the scraping mechanism.

18. A mechanism for cleaning carcasses embracing a track to support and carry the carcasses, beating mechanisms acting centrifugally to whip the carcasses by impact thereagainst, a receptacle adapted to receive the bristles and scurf from the carcasses, means for conveying said bristles and scurf thereto, means washing the bristles and scurf from the carcasses upon said means and means adapted to turn the carcasses when between said scrapers.

19. A carcass cleaning mechanism embracing a scalding tank, an inclined conveyer movable over the bottom thereof, an adjustable conveyer adapted to coact therewith, to move carcasses to one end of said tank, an auxiliary receiving tank communicating with the main scalding tank, a conveyer for receiving the carcasses from the scalding tank, flexible beating mechanisms below said receiving conveyer acting to loosen the bristles and scurf from the carcasses partly by impact against the carcasses and by scraping over the carcasses, auxiliary oppositely disposed beating mechanism arranged closer together than the aforesaid beating mechanism and acting on the parts of the carcass most difficult of access and means for cleaning the carcasses and removing the bristles as loosened therefrom.

20. In a device of the class described the track and two sets of coacting rotative shafts extending longitudinally thereof, those on the same side of the track being substantially parallel, flexible beaters secured on said shafts adapted to strike the carcass, lower beaters striking oppositely from the aforesaid beaters and means below the track and adjacent the top beaters adapted to turn the carcass.

21. In a device of the class described a scalding tank, coacting conveyers for removing a carcass therefrom, one of which is automatically adjustable vertically, a conveyer for receiving the carcasses after scalding, flexible beaters arranged on each side of the last named conveyer and acting to loosen the bristles and scurf on the carcasses, means for removing the bristles and scurf from beneath the beaters, a receptacle to receive said bristles and scurf and means between the receiving conveyer and beaters for turning the carcasses.

22. In a device of the class described rotary shafts, flexible centrifugally acting beater arms secured thereto, curved outwardly directed beater blades on each and plates closely engaging each end of each beater arm therebetween at the opposite end from the beating blades to prevent short bending of the beater arms in either direction.

23. In a device of the class described rotatable shafts, flexible centrifugally acting beaters thereon, scrapers on each beater, means positioned intermediate the end beaters for turning a carcass, short rotatable shafts above the aforesaid shafts and short beaters thereon above said centrifugally acting beaters.

24. In a device of the class described rotatable shafts, flexible centrifugally acting beaters, curved scraper blades on each beater, said blades diverging affording an inwardly converging space therebetween, said beaters acting at an angle from the horizontal, means carrying carcasses past the beaters, and means adapted to turn the carcasses when passing the beaters.

25. In a device of the class described a track to convey the carcasses, shafts arranged below the same on each side thereof, said shafts arranged longitudinally of the track and those on one side inclined oppositely from those on the opposite side, beaters carried on said shafts, each on a different horizontal plane longitudinally of the machine adapting the successive beaters on each shaft to act on different parts of the carcass and scraping the carcasses by whipping the same and auxiliary scrapers acting on the extremity of the carcasses.

26. The combination with a track of gambrel carriages adapted to run thereon, a conveyer acting to move said carriages along the track, rotative shafts arranged on opposite sides of the track, beaters thereon acting on opposite sides of a carcass suspended on a gambrel carriage to strike the bristles therefrom, the beaters on one of said shafts striking upwardly, a conveyer below said track acting to carry the carcass from the machine should it fall from the gambrel carriage and means depending from the track adapted to turn the carcass.

27. The combination with a track of gambrel carriages adapted to run thereon, a conveyer acting to move said carriages along the track, beaters acting on opposite sides of a carcass suspended on a gambrel carriage to strike the bristles therefrom, a receptacle adjacent the beaters, a conveyer movable beneath the beaters, the upper lap adapted to move a fallen carcass to the rear of the scrapers and the lower lap adapted to move the bristles into said receptacle and means actuating said conveyer.

28. The combination with a track of gambrel carriages adapted to run thereon, a conveyer moving said carriages along the track, rotative shafts arranged on opposite sides of the track, beaters thereon acting on opposite sides of the carcasses suspended on the gambrel carriages to strike the bristles therefrom, the beaters on one of said shafts striking upwardly, a conveyer below said track acting to carry the carcass from the machine should it fall from the gambrel carriage, and the lower lap of said conveyer acting to remove the bristles and refuse from the machine, and a guide below the track acting to partly rotate the carcass while passing through the machine.

29. The combination with a track of gambrel carriages adapted to run thereon, a conveyer moving said carriages along the track spaced uniform distances apart, rotative shafts arranged on opposite sides of the track and inclined in the direction of travel of the conveyer, beaters thereon acting on opposite sides of the carcasses suspended on the gambrel carriages to strike the bristles therefrom, the beaters on one of said shafts striking upwardly, a short shaft positioned above the lower end of each upper inclined shaft, scrapers thereon acting on the higher parts of the suspended carcass, a conveyer below said track acting to carry the carcass from the machine should it fall from the gambrel carriage, and the lower lap of said conveyer acting to remove the bristles and refuse from the machine and a guide above the shafts acting to partly rotate the carcass while passing through the machine.

30. In a hog scraping machine the combination with a scalding tank of a bottom conveyer therein acting to deliver the carcasses therefrom, an upper adjustable conveyer acting to move the carcass on to the lower conveyer, an enlargement in said tank adapted to retain the rough carcasses, a track extending above said tank, removable gambrel carriages carried thereon each to support a carcass, means for moving said gambrel carriages along the track and scraping mechanisms disposed on each side of the track, some of which act downwardly upon the carcass and some of which act upwardly thereon from below.

31. In a hog scraping machine the combination with a scalding tank of a bottom conveyer therein acting to deliver the carcasses therefrom, an upper conveyer adjustable relatively to the bottom conveyer acting to move the carcass on to the lower conveyer, an enlargement in said tank adapted to retain the rough carcasses, a track extending above said tank, removable gambrel carriages carried thereon each to support a carcass, means for moving said gambrel carriages along the track and scraping mechanisms disposed on each side of the track, some of which act downwardly upon the carcass and some of which act upwardly thereon from below.

32. In a hog scraping machine the combination with a scalding tank of a bottom conveyer therein acting to deliver the carcasses therefrom, an upper adjustable conveyer acting to move the carcass on to the lower conveyer, an enlargement in said tank adapted to retain the rough carcasses, a track extending above said tank, removable gambrel carriages carried thereon each to support a carcass, means for moving said gambrel carriages along the track and scraping mechanisms disposed on each side of the track inclined longitudinally of the machine, some of which act downwardly upon the carcass and some of which act upwardly thereon from below and means for rotating said carcasses as they pass through the scraping mechanism.

33. In a hog scraping machine the combination with the scalding tank of a bottom conveyer therein acting to deliver the carcasses therefrom, an upper adjustable conveyer acting to move the carcasses on to the lower conveyer, a laterally disposed enlargement in said tank adapted to retain the rough carcasses, a track extending above said tank, removable gambrel carriages carried thereon each to support a carcass, means for moving said gambrel carriages along the track spaced equal distances apart and centrifugally operating means acting on each side of the track and some of which act downwardly upon the carcass and some of which act upwardly thereon from below, and means rotating the carcasses as they pass through the scraping mechanism.

34. In a hog scraping device the combination with the scalding tank of a bottom conveyer therein acting to deliver the carcasses therefrom, an upper conveyer adjustable at its rear end toward or from the bottom conveyer and acting to push the carcasses upon the lower conveyer, a laterally disposed enlargement in said tank adapted to retain the rough carcasses, a track extending above said tank, removable gambrel carriages carried thereon each to support a carcass, means spacing said carriages equal distances apart and moving said gambrel carriages along the track, centrifugally acting scraping means on each side of the track some of which act downwardly upon the carcass and some of which act upwardly thereon from below, means acting to rotate the carcass in the scraping mechanism partly by gravity and a lower conveyer adapted if the carcass fall from the carriage to return the same to the entrance end of the scraper.

35. In a device of the class described the combination with carcass supporting means of oppositely acting scraping mechanism and means acting by gravity to partly rotate the carcass during the scraping.

36. The combination with oppositely acting inclined scraping means of a track to carry the carcasses therebetween and non-moving means acting successively to rotate the carcasses by gravity.

37. In a hog scraping machine the combination with a scalding tank of a bottom conveyer therein acting to deliver the carcasses therefrom, an upper conveyer acting to move the carcass on to the lower conveyer, means elevating or depressing one end of said upper conveyer, an enlargement in said tank adapted to retain the rough carcasses, a plate at the front of the tank having one end extending above the lower conveyer and upon which the carcasses are delivered, a track extending above said tank, removable gambrel carriages carried thereon each to support a carcass, means for pushing said gambrel carriages along the track spaced equal distances apart and scraping mechanism disposed on each side of the track, some of which act downwardly upon the carcasses and some of which act upwardly thereon from below, means rotating the carcasses in part by gravity and means delivering a spray of hot water on the carcass during the scraping operation.

38. In a scraping machine of the class described the combination with a tank of an inclined conveyer in the bottom thereof acting to deliver the carcasses to the rear end thereof approximately at a level with the top of the tank, a lateral pocket in said tank to retain the rough carcasses, an upper adjustable conveyer to push the carcasses upon the delivery conveyer, gambrel carriages adapted to support the carcasses, a conveyer extending over the tank and rearwardly and acting to move the gambrel carriages spaced equal distances apart, means spraying hot water upon the carcasses during their passage, scraping mechanism embracing inclined shafts between which the carcasses are moved by the conveyer and centrifugally acting means thereon some acting downwardly on the carcass and some acting upwardly thereon.

39. In a scraping machine of the class described the combination with a tank of an inclined conveyer in the bottom thereof acting to deliver the carcasses to the rear end thereof approximately at a level with the top of the tank, a lateral pocket in said tank to retain the rough carcasses, an upper adjustable conveyer to push the carcasses upon the delivery conveyer, gambrel carriages adapted to support the carcasses, a conveyer extending over the tank and rearwardly and acting to move the gambrel carriages spaced equal distances apart, means spraying hot water upon the carcasses during their passage, scraping mechanism embracing inclined shafts between which the carcasses are moved by the conveyer, centrifugally acting means thereon some acting downwardly on the carcass and some acting upwardly thereon and means partly rotating the carcasses successively to bring all parts in contact with the scraping mechanism.

40. In a scraping machine of the class described the combination with a tank of an inclined conveyer in the bottom thereof acting to deliver the carcasses to the rear end thereof approximately at a level with the top of the tank, a support for the upper lap of said conveyer, a lateral pocket in said tank to retain the rough carcasses, an upper conveyer to push the carcasses upon the delivery conveyer, means for adjusting one end of said upper conveyer toward and from the tank, gambrel carriages adapted to support the carcasses, a conveyer extending over the tank and rearwardly and acting to move the gambrel carriages spaced equal distances apart, means spraying hot water upon the carcasses during their passage, scraping mechanism embracing inclined shafts between which the carcasses are moved by the conveyer, centrifugally acting means thereon, some acting downwardly on the carcass and some acting upwardly thereon and gravity acting means partly rotating the carcasses successively to bring all parts in contact with the scraping mechanism.

41. In a device of the class described the combination with a scalding tank of a track for delivering the carcasses therefrom, scraping mechanism operating on opposite sides of the track and comprising oppositely inclined rotative shafts directed longitudinally of the track, centrifugally operating means thereon for scraping the carcass, means acting by gravity to turn the carcasses in passing through the scraper, a hot water tank having a perforated cover below the scraping mechanism, a substantially horizontal conveyer movable over the top thereof, the upper run acting to return a fallen carcass to the place of entrance to the scraping mechanism, the lower run thereof acting to carry the bristles rearwardly from the machine and means connected with said last named tank for spraying hot water on the carcass.

42. In a device of the class described the combination with a scalding tank of a track for delivering the carcasses therefrom, scraping mechanisms operating on opposite sides of the track and comprising oppositely inclined rotative shafts directed longitudinally of the track, centrifugally operating means thereon for scraping the carcass, guides above the shafts directing the carcass between the inner ends of the same whereby gravity is utilized to partially rotate the carcass, a hot water tank having a perforated cover below the carcass, a conveyer movable over the top thereof adapted to simultaneously return a fallen carcass to the place of entrance and to remove the bristles or hair from the machine and means connected with said hot water tank for spraying hot water on the carcass.

43. In a device of the class described the combination with a scalding tank of a track for delivering the carcasses therefrom, scraping mechanism operating on opposite sides of the track and comprising oppositely inclined rotative shafts directed longitudinally of the track, centrifugally operating means thereon for scraping the carcass, means acting by gravity to turn the carcasses in passing through the scraper, a hot water tank having a perforated cover below the scraping mechanism, a substantially horizontal conveyer movable over the top thereof, the upper run acting to return a fallen carcass to the place of entrance to the scraping mechanism the lower run thereof acting to carry the bristles rearwardly from the machine, means connected with said hot water tank for spraying hot water on the carcass and means holding the carcasses from rotation during a part of the scraping operation.

44. In a machine of the class described scraping mechanism adapted to act on the carcasses while moving therethrough, a conveyer for moving the carcasses and means rotating each carcass half around when about half way through the scraping mechanism.

45. In a machine of the class described the combination with scraping mechanism of means holding the carcasses from rotation while passing through each end of the scraping mechanism and acting by gravity to partly rotate each carcass when half way through the same.

46. In a machine of the class described mechanism for turning the carcasses embracing a track, gambrel carriages supported upon the track, a conveyer moving the gambrel carriages, a guide against which the gambrel carriages slide and bent at the inner end outwardly and a guide in alinement therewith having its end correspondingly bent outwardly and against which the gambrel engages to complete the half turning of the carcass.

47. A device of the class described embracing a track, gambrel carriages movable thereon, a gambrel rod pivoted at the lower end of each and each adapted to support a carcass, a guide against which the gambrel rod slides and having an outwardly turned end and a corresponding guide against which said gambrel rod engages to complete the half turning of the carcasses and a conveyer for moving the gambrel carriages along the track.

48. In a scraping mechanism of the class described means for scraping the carcasses, a conveyer disposed beneath the same for removing the carcasses falling during operation the lower run of said conveyer acting to remove the bristles from the machine, a hot water tank having a perforated top below said conveyer adapted to permit the bristles and dirt to fall into said tank, a pump connected to and delivering from said tank in a spray upon the carcass during the scraping operation.

49. In a device of the class described the combination with scraping mechanism, of a tank having a lateral enlargement therein to receive the rough carcasses, a conveyer in the bottom of said tank inclining upwardly at the rear end, means adapted to support the upper run of said conveyer, a conveyer for pushing said carcasses on to the bottom conveyer, means admitting of adjusting said upper conveyer as to height relative to the lower conveyer, a curved plate extending into said tank at the rear thereof, a track extending above said tank to remove the carcasses therefrom and mechanical scraping means operating on the carcasses on the track.

50. In a device of the class described the combination with means for carrying the carcasses of a plurality of shafts arranged on opposite sides thereof, one above the other those on one side being in a plane parallel to those on the other and inclined oppositely, a relatively short shaft in the space above the lower end of each upper shaft, flexible beaters on each shaft, scraping means on the outer ends of each beater, those on said short shafts adapted to act on the extremity of the carcass, means rotating the shafts and one of said shafts rotating to strike the beaters thereon upwardly against the carcass.

51. In a device of the class described the combination with a track for carrying the carcasses, shafts arranged on opposite sides thereof one above the other those on one side of the track lying in a plane parallel with those on the other side, and inclined oppositely, a relatively short shaft in the space above the lower end of each upper shaft, flexible beaters on each shaft, scraping means on the outer ends thereof, said beaters on the short shafts acting on the upper extremity of the carcasses, means rotating the shafts, one of which rotates to strike the beaters upwardly against the carcass, means spraying the carcasses with fluid during the passage through the scrapers and means partly rotating the carcasses while acted on by the scrapers.

52. In a device of the class described the combination with means for carrying the carcasses, of shafts arranged on opposite sides of the track one above the other those on one side of the track lying in a plane parallel with those on the other side, a relatively short shaft above the ends of each upper shaft, centrifugal beaters on said shafts, scraping blades on the outer ends of said beaters, said beaters on the shorter shafts acting on the outer extremities of the carcass, means rotating the shafts and rotating at the bottom to strike its beaters upwardly against the carcass, and alined guides between the shafts and track along which the carcasses move and between the ends of which the carcasses rotate.

53. In a device of the class described the combination with a track for carrying the carcasses of a plurality of rotative shafts arranged one above the other on each side of the track those on one side being on a plane parallel with those on the other and inclined oppositely, flexible oppositely directed beaters on each shaft of a length to extend closely to the adjacent shaft above or below the same and arranged staggering with those on the adjacent shafts both in the same and in the opposite set of shafts, scraping knives on said beaters affording an inwardly converging opening between the same and some of which scrape downwardly upon the carcass and some of which scrape upwardly thereon and relatively short shafts in the angle above the lower end of the upper shafts and shorter beaters thereon.

54. In a device of the class described the combination with a track for carrying the carcasses of a plurality of inclined rotative shafts arranged one above the other on each side the track, those on one side being in a plane parallel with those on the other and inclined oppositely and longitudinally of the track, centrifugally acting beaters on each shaft of a length to extend closely to the adjacent shaft above and below the same and arranged staggering with those on adjacent shafts both in the same and the opposite set of shafts, curved scraping knives on said beaters affording an inwardly converging opening between the same and some of which scrape downwardly upon the carcass and some of which scrape upwardly thereon and relatively short shafts in the angle above the lower end of the upper inclined shafts and shorter beaters thereon said beaters comprising strips of flexible material bolted to each shaft in oppositely directed pairs.

55. In a device of the class described a scraping mechanism embracing a track to carry the carcasses and the shafts arranged in sets on opposite sides of the track and inclining longitudinally thereof in opposite directions those at one side of the track inclining at an angle with those on the other, a plurality of short shafts in the angles above the lower ends of the upper shafts, coacting beaters on all of said shafts the outer ends of which swing in close relation with the adjacent shafts both on the same and on the opposite sides of the track, shorter beaters on the short shafts and means rotating one of the lower of said shafts oppositely from the remaining shafts on the same side of the track.

56. In a device of the class described a plurality of parallel rotative shafts, centrifugally acting beaters thereon, those on one shaft being staggered relatively those on an adjacent shaft and extending close to the adjacent shafts, scraping blades thereon, a fluid receptacle beneath the beaters, and means adapted to automatically convey a fallen carcass and the material scraped from the carcasses to opposite ends of the receptacle.

57. In a device of the class described the combination with the scraping means of a tank below the same having a perforated cover and of a length corresponding with the scraper, a horizontal conveyer acting above the tank the upper lap for conveying fallen carcasses to the entrance of the scraper the lower delivering the bristles in the opposite direction and means connected in the tank for spraying the carcass.

58. A scraping mechanism embracing centrifugally acting beaters some acting downwardly and some acting upwardly on the carcass means carrying the carcass therebetween and means partly rotating the carcass during the operation.

59. A scraping mechanism embracing a runway for the carcass, scraping means located on opposite sides of the runway and some acting downwardly and some upwardly on the carcass, guides between the runway and scraping means holding the carcass from rotation when traveling part of the way through the scrapers and one end of each guide adapted to turn the carcass through substantially 90 degrees while the carcass is being operated upon by the scrapers.

60. A scraping mechanism embracing a runway for the carcasses, scraping means located on opposite sides of the runway and some acting downwardly and some acting upwardly on the carcasses and means turning the carcass while passing between the scrapers.

61. A scraping device embracing a runway for the carcasses, scraping means on opposite sides of the runway oppositely inclined at approximately the same angle from the vertical, means guiding and turning a carcass between said scrapers, said scrapers acting simultaneously on said carcass as the same turns at various angles therewith.

62. In a device of the class described the combination with a scalding tank of a conveyer adapted to carry carcasses successively therefrom, scrapers positioned on each side of the travel of the carcasses, a stationary apron adjacent the scrapers and means adapted to convey a fallen carcass from beneath the scrapers and adapted to move the hair and refuse into said apron.

63. In a device of the class described the combination with a scalding tank of means carrying carcasses therefrom, scraping mechanism positioned one on each side of the travel of the carcass and acting upwardly and downwardly thereon, a tank below said scrapers, a conveyer movable over and adjacent the top thereof, means inclosing said scraping mechanism and last named tank adapted to direct a falling carcass onto said conveyer, swinging doors adjacent the entrance to and exit from said scrapers and a receptacle adjacent the last named tank to receive the bristles and hair from the conveyer.

64. A scraping device embracing a runway, conveyers moving carcasses along the same, means below the runway turning the carcass and oppositely disposed scrapers inclined oppositely at a slight angle from the vertical and acting simultaneously upwardly, downwardly and at an angle with the carcass as the same turns therebetween.

65. The combination with a conveyer of gambrel carriages adapted to support a carcass, scraping mechanism acting simultaneously to scrape the carcasses upwardly and downwardly at a slight angle to the vertical and means positioned adjacent the carriages adapted to prevent rotation of the carcasses during part of the scraping operation and turning the carcasses during part of the operation.

66. In a hog scraping machine the combination with conveyers, of means supporting a suspended carcass thereon, means below the conveyer turning the same, a plurality of scrapers acting on the carcass while turning, spraying means removing the bristles as scraped from said carcass and a receptacle adapted to receive the bristles.

67. In a device of the class described the combination with means carrying a suspended carcass, of means adjacent the carrying means for automatically turning the carcasses, a plurality of scrapers acting upwardly, downwardly and at various angles on the carcass while turning, means removing the bristles and hair from said carcass as loosened by the scrapers and a receptacle adapted to receive the same.

68. In a device of the class described the combination with means supporting a carcass, of shafts positioned on each side of the support, guides between the same and supporting means for preventing turning of the carcass when passing part of the length of the shafts, flexible centrifugally acting beaters acting on said carcasses when secured from turning, said guides adapted to aid in turning the carcasses when passing other parts of the shafts and flexible centrifugally acting beaters acting on the carcasses while turning.

69. In a device of the class described the combination with means supporting a carcass, of means adjacent the supporting means assisted by gravity adapted to turn the carcass, beaters acting obliquely on the carcass when turning, beaters of different lengths adapted to act on the extremity of said carcass, a perforated spraying pipe and means forcing a fluid therethrough to remove the bristles from said carcass when loosened by the scrapers.

70. In a device of the class described the combination with means supporting a suspended carcass, of beaters acting obliquely thereon and inclined in the direction of travel of the carcass, oppositely inclined auxiliary beaters positioned adjacent said beaters, spraying mechanism adapted to remove the loosened bristles from the carcass. a receptacle for the bristles, a conveyer adapted to move said bristles from beneath the scrapers into said receptacle and said conveyer acting to move a fallen carcass oppositely from the direction the bristles are conveyed.

71. The combination with means supporting a suspended carcass of means for moving the carcass, shafts inclined in the direction of travel of the carcasses and adjacent the same and beaters carried by said shafts adapted to act on said carcass successively from end to end.

72. In a device of the class described the combination with a track of means supporting a carcass thereon, means moving the carcass along the track, shafts on each side of the track, and beaters on said shafts some acting from the upper extremity successively downwardly, some acting from intermediate the extremities successively upwardly, some acting on said carcass oppositely and upwardly and all of said beaters inclined in the direction of travel of the carcass and acting longitudinally thereof removing the hair and bristles by whipping the carcass.

73. In a scraping and polishing machine the combination with an inclined rotary shaft of flexible beaters thereon, means passing the carcasses longitudinally of the shaft in operative relation with the beaters and means for rotating the carcasses while acted on by the beaters.

74. The combination with a track of a carriage supporting a suspended carcass, shafts adjacent the track and scrapers arranged in alinement longitudinally of the track and each scraper on a different horizontal plane than its predecessor thereby successively scraping the carcasses from end to end as they move along the track some acting from the lower end upwardly, some acting on said carcasses from the upper end downwardly and the remainder acting on the carcasses from intermediate the extremities of the carcass upwardly and downwardly.

75. The combination with a track of means supporting carcasses, means moving the carcasses along the track, shafts positioned adjacent the track, scrapers on said shafts some acting gradually from the lower extremity upwardly and some acting successively from the upper extremity of the carcass toward the lower end and means above and between the shafts for turning each carcass while the scrapers operate thereon.

76. In a mechanism for cleaning carcasses a scalding tank, an auxiliary scalding tank opening therefrom, coacting conveyers for moving carcasses out of the tank, one of said conveyers being adjustable relatively of the other, a track, means supporting carcasses, means moving the same along the track, inclined shafts positioned adjacent the track on each side of the line of travel of the carcasses, scrapers arranged on some of said shafts, each scraper inclined in the direction of travel of the carcass and acting longitudinally of the carcass to successively scrape the same from the lower extremity to the upper extremity and scrapers positioned on some of said shafts to successively scrape said carcass from the upper extremity to the lower end.

77. The combination with a track of means carrying carcasses thereon, oppositely inclined shafts adjacent and on each side of the track, scrapers on said shafts adapted to scrape the carcasses from both extremities successively to the opposite extremities and all of said scrapers acting at an angle to the carcass and centrifugally and automatic means positioned above the shafts for turning the carcasses approximately centrally the distance they travel between the scrapers.

78. The combination with a track of means carrying carcasses thereon, inclined shafts arranged on each side of the track, scrapers on some of said shafts adapted to successively scrape the carcasses from the lower extremity to the upper extremity, scrapers on some of said shafts adapted to scrape the carcasses from the upper extremity successively to the lower extremity, scrapers on some of said shafts adapted to scrape said carcasses intermediate the ends and acting successively on the carcasses to both extremities, a casing inclosing the scraping mechanism, swinging doors at the entrance and exit thereto, a conveyer adapted to remove the bristles and refuse scraped from the carcasses and an apron or receptacle to receive the same.

79. In a scraping and polishing machine the combination with an inclined rotary shaft of flexible beaters thereon and means passing the carcasses longitudinally of the shaft in operative relation with the beaters.

80. The combination with a track of means carrying suspended carcasses therealong, shafts adjacent the tracks, beaters acting on the same side of said carcasses from each extremity toward the center, beaters acting on said carcass on the same side successively from the lower extremity and center upwardly, said scrapers acting at different angles thereon, means adapted to turn each carcass after part of the scraping operation is finished and before the carcass leaves the scrapers, means beneath the scrapers for continuously removing the material scraped from the carcasses and inclined auxiliary scrapers adapted to act on the highest parts of the carcass.

81. In a hog scraper, the combination of a rotatable shaft, one or more flexible members secured to said shaft and adapted to be thrown outwardly by centrifugal force when the shaft revolves, said members having an upward movement during a portion of their rotation, and means for supporting a hog in such a position that its forelegs will be in the upward path of travel of said member or members and be scraped thereby.

82. In a hog scraper, the combination of a rotatable shaft, means to rotate said shaft, one or more flexible members attached to said shaft and adapted to be thrown outwardly by centrifugal force as said shaft rotates, and means to support a hog in such position that it will be struck by said flexible members.

In testimony whereof I have hereunto subscribed my name in the presence of two subscribing witnesses.

JOHN W. KOHLHEPP.

Witnesses:
C. W. HILLS,
W. W. WITHENBURY.